(12) United States Patent
Kobayashi et al.

(10) Patent No.: US 6,467,567 B2
(45) Date of Patent: Oct. 22, 2002

(54) POWER STEERING APPARATUS

(75) Inventors: Masanori Kobayashi, Nara; Kouji Ogushi, Osaka; Takefumi Deyama, Nara; Etsuro Kitami, Nara; Hiroaki Murakami, Nara; Teruo Tsutsui, Osaka; Takashi Tsutsui, Osaka, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 14 days.

(21) Appl. No.: 09/725,001

(22) Filed: Nov. 29, 2000

(65) Prior Publication Data
US 2001/0001932 A1 May 31, 2001

(30) Foreign Application Priority Data
Nov. 30, 1999 (JP) .......................... 11-339533

(51) Int. Cl.[7] ................................. B62D 5/99
(52) U.S. Cl. ...................... 180/444; 180/428
(58) Field of Search ................. 180/443–447, 180/428; 74/388 PS, 422

(56) References Cited

U.S. PATENT DOCUMENTS

| | | | | |
|---|---|---|---|---|
| 4,428,450 A | * | 1/1984 | Stenstrom et al. | 180/148 |
| 4,479,400 A | * | 10/1984 | Rieger | 74/422 |
| 5,020,616 A | | 6/1991 | Yagi et al. | 180/79.1 |
| 5,738,183 A | * | 4/1998 | Nakajima et al. | 180/444 |
| 5,788,009 A | | 8/1998 | Lee | 180/428 |
| 5,871,064 A | * | 2/1999 | Suzuki et al. | 180/400 |
| 5,971,094 A | * | 10/1999 | Joshita | 180/444 |

FOREIGN PATENT DOCUMENTS

| | | |
|---|---|---|
| EP | 0787640 A2 | 8/1997 |
| GB | 2290761 A | 1/1996 |
| JP | 63-39166 | 10/1988 |
| JP | 5-23434 | 6/1993 |
| JP | 6-78156 | 11/1994 |
| JP | 8-1466 | 1/1996 |

OTHER PUBLICATIONS

European Search Report dated Aug. 23, 2001.

* cited by examiner

Primary Examiner—Brian L. Johnson
Assistant Examiner—L. Lum
(74) Attorney, Agent, or Firm—McGinn & Gibb, PLLC

(57) ABSTRACT

When a steering wheel is relatively quickly turned at the time of parking, before a first stopper mechanism located between an input shaft and an output shaft is operated, an elastic member 47 attached to a movement end of a rack shaft 13 comes into contact with a rack stopper 39 of a rack housing 14, thereby absorbing the impact at the time of steering at parking. That is, the strike speed when contact portions of the first stopper mechanism are brought into contact with each other, is slowed down. Accordingly, the uncomfortable noise due to the strike sound is not given to the driver.

20 Claims, 4 Drawing Sheets

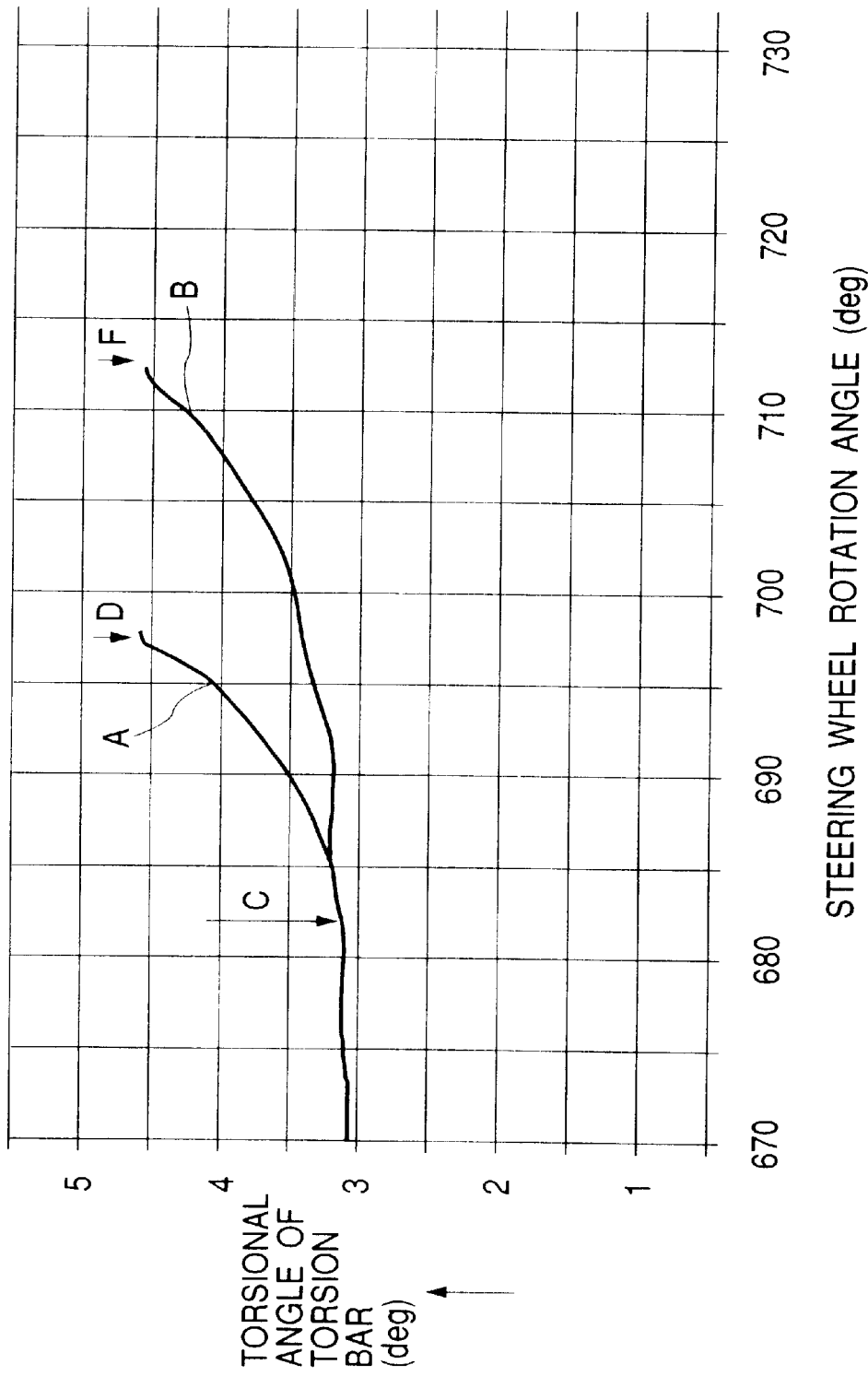

Figure 1:
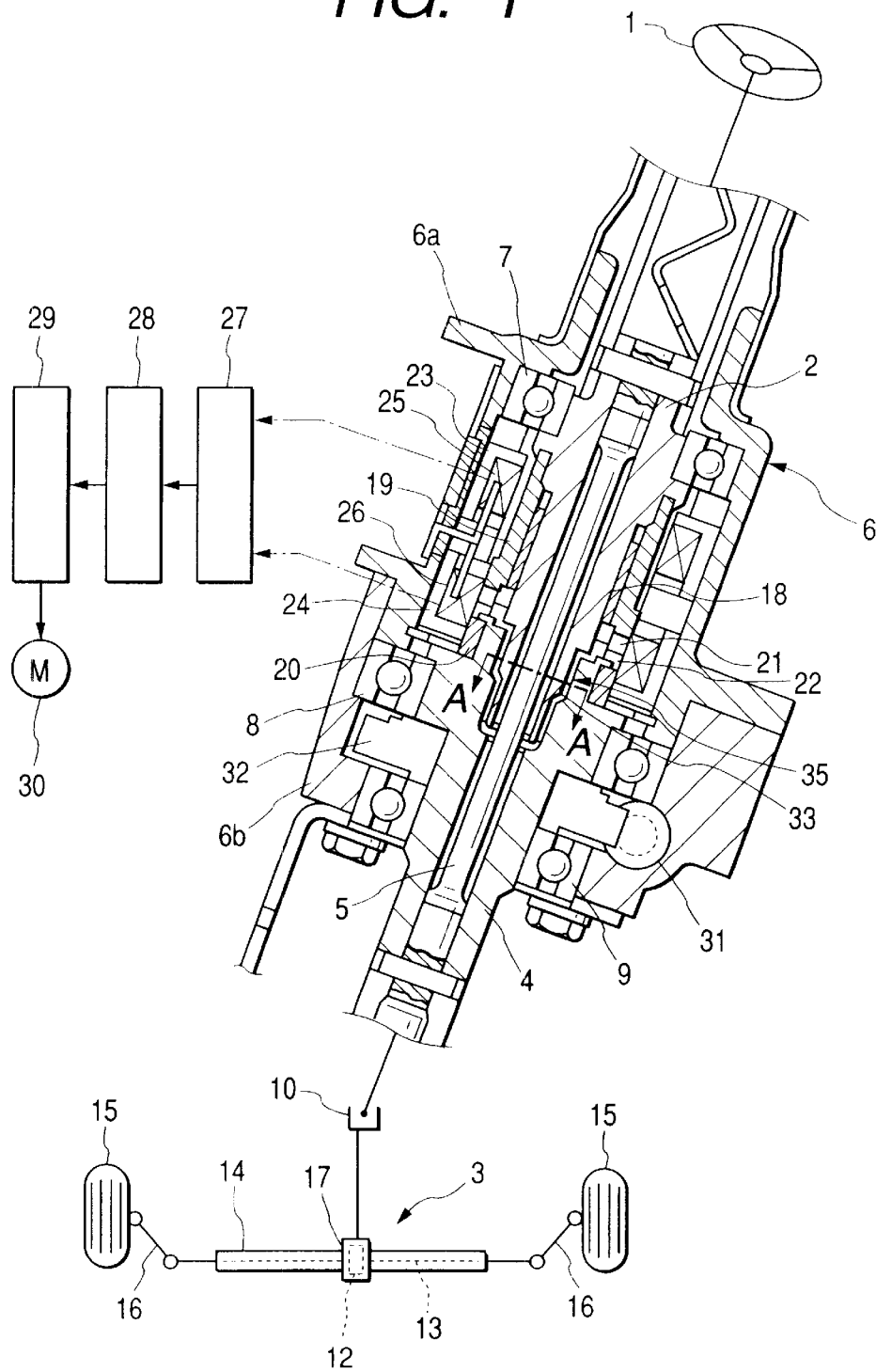

POWER STEERING APPARATUS

BACKGROUND OF THE INVENTION

The present invention relates to a power steering apparatus, and is preferably applicable to an electric power steering apparatus for assisting the steering force using the rotation force of an electric motor.

As the power steering apparatus, an oil pressure power steering apparatus and an electric power steering apparatus are available.

In the oil pressure type power steering apparatus as disclosed in Japanese Utility Model Kokai Publication No. Hei. 6-78156, a valve mechanism is formed between an input axis and an output axis, and a so-called valve stopper by which the relative rotation of the input axis and output axis is regulated to a predetermined angle, is provided. Because this valve stopper is arranged in the oil in an engine room, a sound of collision of the valve stopper is hardly heard by the driver.

On the one hand, in the case of the electric power steering apparatus in which the steering assistant force is generated by an electric motor provided in a column as disclosed in Japanese Utility Model Kokoku Publication No. Hei. 8-1466, the stopper to regulate the relative rotation of the input axis and the output axis is arranged in a car room. Accordingly, when the steering wheel is turned maximum, for example, at the time of parking, the stopper impact sound is transmitted to the driver as a rasping sound. Accordingly, it is considered that a cushioning material, such as rubber, is provided at a stopper portion between the input axis and the output axis, however, a space is narrow, and actually, the layout is difficult. Further, even when the cushioning material is arranged, only a cushioning material having the small impact absorption capacity can be arranged, and the durability is decreased.

SUMMARY OF THE INVENTION

In view of the foregoing problems, the present invention is attained, and an object of the present invention is to provide an power steering apparatus by which the generation of the impact sound at the time of steering at parking is greatly decreased.

The present invention is directed to a power steering apparatus in which a steering assistant force for driving a steering mechanism is generated in accordance with a relative displacement between an input shaft and an output shaft connected to each other through a torsion bar.

The power steering apparatus comprises:

- a first stopper mechanism located between the input shaft and the output shaft, the first stopper mechanism including a pair of mating contact portions contactable with each other to regulate a relative rotation between the input shaft and the output shaft within a predetermined range; and
- a second stopper mechanism provided at each end of the steering mechanism, the second stopper mechanism including a pair of mating contact members contactable with each other to regulate a movement of a sliding shaft in the steering mechanism.

In the power steering apparatus, at least one of the contact members includes an elastic member, and when the sliding shaft is moved to a stroke end, the second stopper mechanism is operated and thereafter the first stopper mechanism is operated.

When the steering wheel is turned maximum at the time of parking, the second stopper mechanism including the elastic member provided outside the car room is operated earlier, i.e., before the first stopper mechanism arranged in the car room is operated. Since the contact members including the elastic member contact with each other, the impact is fully absorbed. That is, the strike speed when contact portions contact with each other, is relieved, or the contact itself can be avoided in some cases. Accordingly, the generation of the uncomfortable noise in the car room due to the strike sound of the first stopper mechanism can be prevented.

The present disclosure relates to the subject matter contained in Japanese patent application No. Hei. 11-339533 (filed on Nov. 30, 1999), which is expressly incorporated herein by reference in its entirety.

BRIEF DESCRIPTION OF THE DRAWINGS

FIG. 1 is a sectional view schematically showing an electric power steering apparatus according to an embodiment of the present invention.

FIG. 2 is a sectional view taken along a line A—A of FIG. 1.

FIG. 3 is a sectional view of a main portion of a steering mechanism.

FIG. 4A is a sectional view showing a combination of an elastic member and a holder according to another embodiment of the present invention.

FIG. 4B is a plane view showing a side of the combination of the elastic member and the holder.

FIG. 4C is a partial plane view showing an opposite side of the combination of the elastic member and the holder as viewed in an arrow X direction of FIG. 4A.

FIG. 4D is a partial sectional view taken along a line D—D of FIG. 4B.

FIG. 5 shows a test result.

DESCRIPTION OF THE PREFERRED EMBODIMENT

Referring to the drawings, a preferred embodiment of the resent invention will be described below. FIG. 1 is a schematic sectional view of an electric power steering apparatus according to an embodiment of the present invention. Referring to FIG. 1, in the electric power steering apparatus (hereinafter, simply called power steering apparatus), an input shaft 2 onto which a steering wheel 1 is attached, and an output shaft 4 onto which a steering mechanism 3 is attached, are coaxially joined to each other through a torsion bar 5. The input shaft 2 and the output shaft 4 are supported rotatably by a cylindrical housing 6 made of aluminum alloy attached onto a car body (not shown) through bearings 7 and 8. The housing 6 is made by a combination of an upper housing **6*a* and a lower housing 6*b*. The housing 6 constitutes part of a column disposed within a car room. A bearing 9 rotatably supports a lower portion of the output shaft 2 to the lower housing 6*b***.

A lower end of the output shaft 4 is connected through a universal joint 10 to the steering mechanism 3 formed of, for example, a rack and pinion mechanism. The steering mechanism 3 is provided with a pinion shaft 12 which is joined to the output axis 4 through the universal joint 10 to be rotatable along with the output shaft 12. The steering mechanism 3 is further provided with a rack shaft 13 as a sliding shaft, which is engaged with the pinion shaft 12.

The rack shaft 13 serving as the sliding shaft is supported slidably in the axial direction within the rack housing 14 which is elongated in the lateral direction of the car body. Both ends of the rack shaft 13 are respectively protruded from lateral ends of the rack housing 14, and joined to knuckle arms (not shown) of steered wheels 15 via tie rods 16. A gear housing 17 for rotatably supporting the pinion shaft 12 is fixed onto a longitudinal intermediate portion of the rack housing 14 in such a manner that the gear housing 17 intersects the rack housing 14.

A first cylinder 19 made of magnetic material is fixed to the outer periphery of the input shaft 2 through a sleeve 18 made of non-magnetic material. Further, a second cylinder 20 made of magnetic material is fixed onto the outer periphery of the upper portion of the output shaft 4. The opposing end surfaces of the cylinders 19 and 20 are respectively formed into a large number of rectangular tooth portions 21 and 22 that are arranged at equal pitch in the circumferential direction. A predetermined clearance is kept between the adjacent tooth portions 21 and 22.

Sleeves 23 and 24 are fixed to the interior of the housing, each of which is made of sintered metal of magnetic material and has a C-shape in section. The sleeve 24 is arranged over the opposing portions of the first cylinder 19 and the second cylinder 20. A temperature compensation coil 25 and a torque detection coil 26 serving as a torque sensor are housed in the sleeves 23 and 24, respectively. The sleeve 23 forms a magnetic circuit with the first cylinder 19, and the sleeve 24 forms a magnetic circuit with the first cylinder 19 and the second cylinder 20.

Signals are given to a control section 28 from the torque detection coil 26 and the temperature compensation coil 25 through a sensor circuit 27. The control section 28 recognizes the direction and the magnitude of the steering torque applied onto the steering wheel 1 based on these signals, and rotates a steering assisting motor 30 connected to the output side of the control section 28 through a drive circuit 29, in the direction corresponding to the operational direction of the steering wheel 1.

A rotatably supported worm shaft 31, which penetrates through the lower hosing 6b, is joined to a rotation shaft (not shown) of the motor 30, and a worm wheel 32 driven by this worm shaft 31 is attached to an axially intermediate portion of the output shaft 4 to be rotatable along with the output shaft 4.

Figure 2:
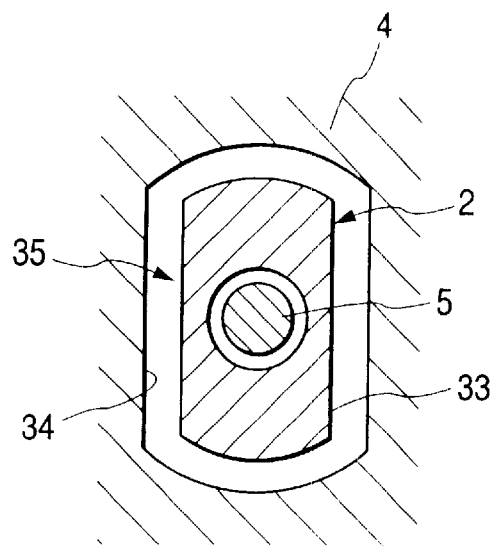
Figure 3:
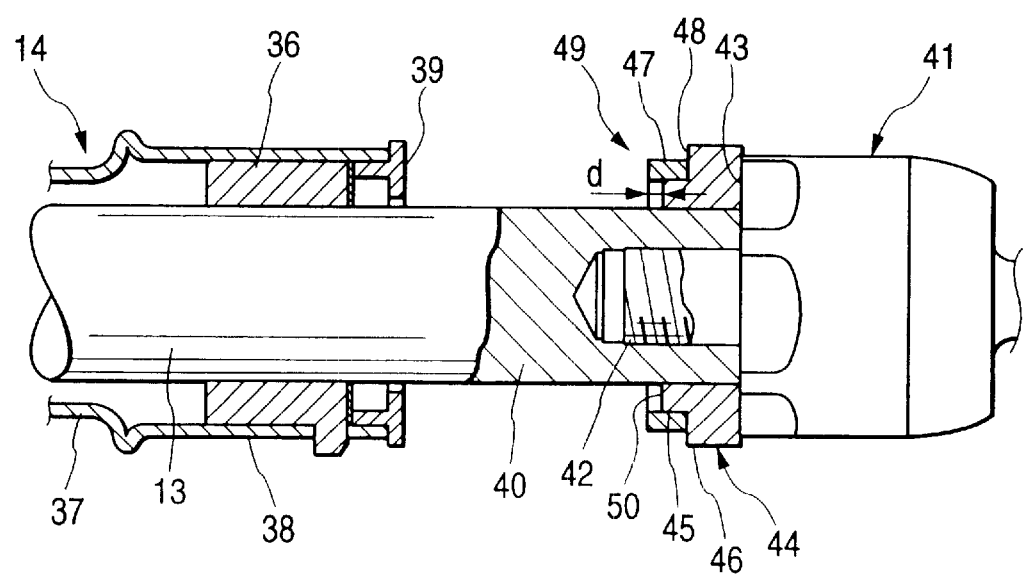

Further, a reduced diameter portion 33 is provided on the end portion of the input shaft 2, and the reduced diameter portion 33 is accommodated in a hole 34 provided in the output shaft 4. The outer peripheral surface of the reduced diameter portion 33 and the inner peripheral surface of the hole 34 form mating contact portions contactable with each other. A first stopper mechanism 35 is constructed by these mating contact portions. The first stopper mechanism 35 in this embodiment is constructed such that each of the reduced diameter portion 33 and the hole 34 is formed into an oblong shape having opposing arcuate surfaces and opposing planar surfaces as shown in FIG. 2, thereby regulating the relative rotation between the input shaft 2 and the output shaft 4 within a predetermined range by contact between the reduced diameter portion 33 and the hole 34.

Numeral 36 designates a rack bush inserted into an end portion 38 of a cylinder tube 37 of the rack housing 14, and numeral 39 designates a rack stopper for covering the end portion 38 of the cylinder tube 37 in the condition in which the rack shaft 13 can be moved into or out of the end portion 38. A joint 41 to be connected to the tie rod 16 is attached to an end portion 40 of the rack axis 13 by a screw 42.

Further, a ring-shaped holder 44 formed of, for example, resins is fixed on the end portion 40 of the rack shaft 13 in such a manner that the holder 44 is received by an end surface 43 of the joint 41. This holder 44 has a reduced diameter portion 45 on the rack stopper 39 side, and has a large diameter portion 46 on the joint 41 side. An elastic member 47 such as rubber is fitted over and fixed to the reduced diameter portion 45. One end of the elastic member 47 is in contact with an annular step portion 48 which is a boundary between the large diameter portion 46 and the reduced diameter portion 45, and the other end is protruded toward the rack stopper 39 side by a predetermined length d from an end face 50 of the reduced diameter portion 45. The rack stopper 39 and the elastic member 47 form mating contact members contactable with each other. A second stopper mechanism 49 is constructed by these members 39 and 47.

The second stopper mechanism 49 operates as follows: When the rack shaft 13 is slidingly moved to the stroke end, the elastic member 47 comes into contact with the rack stopper 39, and is shortened within the predetermined length d. This deformation of the elastic member 47 absorbs the impact. Because the elastic member 47 is received by the resin holder 44, the cushioning property is high.

The positional relationship of the components constituting the stoppers 35 and 49 is set so that, after the second stopper mechanism 49 absorbs the impact, the first stopper mechanism 35 is operated.

When the sliding shaft, i.e. the rack shaft 13, is moved to the stroke end, and when the rack stopper 39 and the elastic member 47 in the second stopper mechanism 49 contact with each other within an elastic range (within the predetermined length d) of the elastic member 47, the outer peripheral surface of the reduced diameter portion 33 and the inner peripheral surface of the hole 34 in the first stopper mechanism 35 are brought into contact with each other.

In the present embodiment, when the steering wheel 1 is turned maximum at the time of parking, before the reduced diameter portion 33 and inner peripheral surface of the hole 34 of the first stopper mechanism 35 arranged in the car room are brought into contact with each other, the elastic member 47 of the second stopper mechanism 49, which is provided outside the car room and whose impact absorbing property is high, comes into contact with the rack stopper 39, thereby absorbing the impact. That is, the second stopper mechanism 49 serves to reduce the strike speed between the reduced diameter portion 33 and the inner peripheral surface of the hole 34 in the first stopper mechanism 35, and, in some cases, eliminates the contact therebetween. Accordingly, it is possible to prevent uncomfortable noise due to the strike sound in the first stopper mechanism 35 from generating in the car room.

FIGS. 4A to 4D shows a combination of a holder 144 and an elastic member 147 which constitutes the second stopper mechanism 49 according to a second embodiment of the present invention. Similarly to the first embodiment, the holder 144 is fitted over and fixed to the end portion 40 of the rack shaft 13 so that the end face of the holder 144 is kept in contact with the joint 41 and the end face of the elastic member 147 is protruded toward the rack stopper 39 side. One of differences of the second embodiment from the first embodiment is that the elastic member 147 in the second embodiment is molded integrally on the holder 144, whereas the elastic member 47 in the first embodiment is fitted over and fixed to the holder 44.

The holder 144 has an annular groove 144a which is to be located in the rack stopper 39 side, and four D-shaped holes 144b which are to be located in the joint 41 side and which are arranged at equal interval circumferentially. The four D-shaped holes 144b are communicated with the annular groove 144a. That is, the D-shaped holes 144b are opened at a bottom 144c of the annular groove 144a.

Figure 4A:
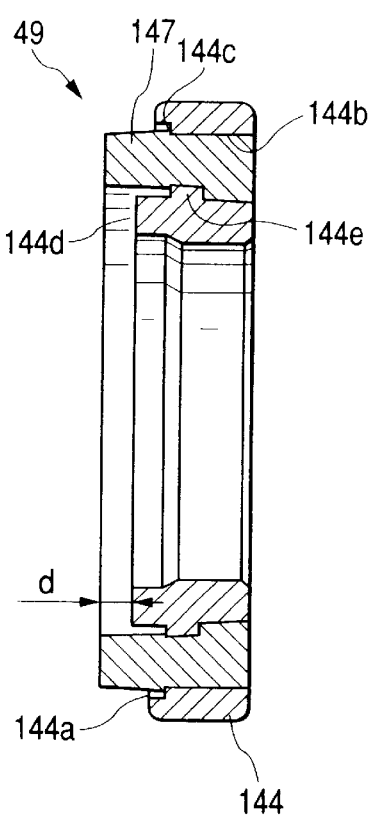
Figure 4B:
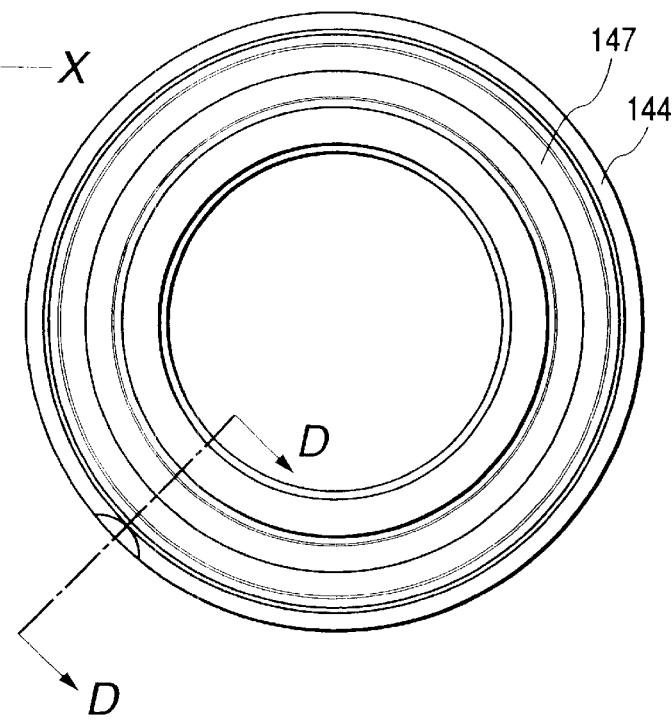
Figure 4C:
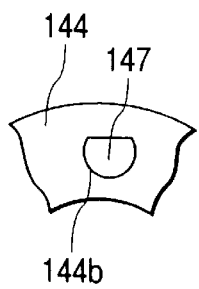
Figure 4D:
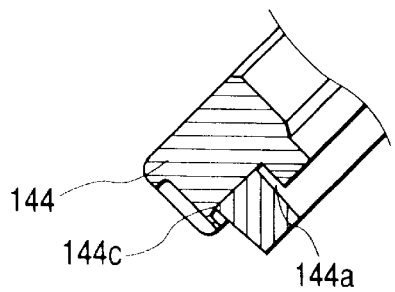

After the holder 144 is molded of resin, nylon or the similar relative hard material, the elastic member 147 is molded of rubber, such as NBR, CR, and similar relatively soft material having high impact absorbing ability, onto the holder 144. As shown in FIG. 4A, a part of the elastic member 147 is set in the annular groove 144c to be protruded from an end face 144d of the holder 144 by a predetermine length d (in this embodiment, the length d is set to be about 2 mm), whereas the rest of the elastic member 147 is filled in the four D-shaped holes 144b. In this embodiment, a diameter reduced portion 144e is provided for each hole 144b so as to positively hold the elastic member 147 onto the holder 144.

This arrangement for the holder 144 and the elastic member 147 according to the second embodiment can effectively eliminate removal of the elastic member 147 from the holder 144 and damage of the elastic member 147 when the elastic member collides against the rack stopper 39.

In the second embodiment, the elastic member 147 is molded integrally onto the holder 144, but the elastic member 147 may be separately molded from the holder 144 and vulcanizing-adhered onto the holder 144.

FIG. 5 shows a test result, i.e. a relationship between a torsional angle of the torsion bar 5 and a rotation angle of the steering wheel 1, evidencing the advantage of the present invention. The line A in FIG. 5 shows the relationship when the steering wheel 1 is turned in a first case (a comparative example) where the elastic member 47 is omitted from the first embodiment, and the line B in FIG. 5 shows the relationship when the steering wheel 1 is turned in a second case (the present invention) where the elastic member 47 is installed in place in the first embodiment. Further, reference character C in FIG. 5 denotes a point from which the elastic member 47 starts contacting the rack stopper 39 in the second case, and reference characters D and F in FIG. 5 respectively denote points at which the first stopper mechanism 35 is operated in the first case and the second case, respectively.

As can be seen from the points C and F, the second stopper mechanism 49 is set to be operated before the first stopper mechanism 35 is operated.

The inclination of the line extending from the point C to the point D is larger than the inclination of the line extending from the point C to the point F. This means that the provision of the elastic member 47 in the second case remarkably reduce or absorbs the impact (the strike sound) caused by the first stopper mechanism 35.

That is, the elastic member 47 in the second case acts gradually from the point C to the point F to remarkably reduce an increasing ratio of the torsional angle per the steering wheel rotation angle, thereby suppressing impact noise generating from the first stopper mechanism 35.

Incidentally, the present invention is not limited to the above embodiments. For example, although the elastic member in the embodiment is moved along with the rack shaft 13, the present invention is not limited to this, and the elastic member may be fixed to the rack stopper 39. Further, the elastic member may be arranged on each of the rack stopper 39 and the holder 44, 144. Further, the holder 44, 144 may be dispensed with, that is, the elastic member may be held by the joint 41 directly. Various modifications including but not limited to the above-noted modifications can be made within the scope of the present invention.

In addition, although the present invention has been described with reference to an electric power steering apparatus, the present invention may be applied to an oil pressure power steering apparatus if the oil pressure power steering apparatus employs a similar first stopper mechanism located in a car room and suffers from the noise generated from the first stopper mechanism.

What is claimed is:

1. A power steering apparatus in which a steering assisting force for driving a steering mechanism is generated in accordance with relative displacement between an input shaft and an output shaft connected to each other through a torsion bar, the power steering apparatus comprising:

a first stopper mechanism located between the input shaft and the output shaft, the first stopper mechanism including a pair of mating contact portions contactable with each other to regulate a relative rotation between the input shaft and the output shaft within a predetermined relative rotation range; and a second stopper mechanism provided at each end of the steering mechanism, the second stopper mechanism including a pair of mating contact members contactable with each other to regulate a movement of a sliding shaft in the steering mechanism, wherein at least one of the contact members include an elastic member, and when the sliding shaft is moved to a stroke end, the second stopper mechanism is operated and thereafter the first stopper mechanism is operated, wherein the first stopper mechanism is located within a column in a car room.

2. The power steering apparatus according to claim 1, further comprising:

a motor for generating the steering assistant force for driving the steering mechanism in accordance with a relative displacement between an input shaft and an output shaft.

3. The power steering apparatus according to claim 1, wherein when the sliding shaft is moved to the stroke end, the contact members in the second stopper mechanism are brought into contact with each other prior to contact between the contact portions in the first stopper mechanism.

4. The power steering apparatus according to claim 1, wherein when the sliding shaft is moved to the stroke end, and when the contact members in the second stopper mechanism contact with each other within an elastic range of the elastic member, the contact portions in the first stopper mechanism are brought into contact with each other.

5. The apparatus of claim 1, wherein the second stopper mechanism includes a ring shaped holder abutting against a joint of a rack shaft and an elastic member positioned on the ring shaped holder and opposing a rack stopper on a rack housing.

6. The apparatus of claim 5, wherein the ring shaped holder includes a large diameter portion having an end surface abutting the joint, a reduced diameter portion receiving the elastic member and an annular step portion between the large diameter portion and the reduced diameter portion.

7. The apparatus of claim 5, wherein the elastic member protrudes from the ring shaped holder a predetermined length toward the rack stopper.

8. The apparatus of claim 5, wherein the elastic member comprises rubber.

9. The apparatus of claim 5, wherein the ring shaped holder comprises at least one of a resin and nylon.

10. The apparatus of claim 5, wherein the elastic member is fixed to the ring shaped holder.

11. The apparatus of claim 5, wherein the ring shaped holder is fixed to a end portion of the rack shaft.

12. The apparatus of claim 5, wherein the elastic member is integrally molded on the ring shaped holder.

13. The apparatus of claim 5, wherein the ring shaped holder has an annular groove and at least one D-shaped hole.

14. The apparatus of claim 13, wherein the at least one D-shaped hole comprised at least two D-shaped holes arranged at equal intervals circumferentially on the ring shaped holder.

15. The apparatus of claim 13, wherein the at least one D-shaped hole is located on a joint side of the ring shaped holder.

16. The apparatus of claim 13, wherein the at least one D-shaped hole communicate with the annular groove.

17. The apparatus of claim 13, wherein at least a portion of the elastic member is received in the at least one D-shaped hole.

18. The apparatus of claim 13, wherein the at least one D-shaped hole includes a diameter reduced portion.

19. The apparatus of claim 13, wherein at least a portion of the elastic member is received in the annular groove.

20. The apparatus of claim 5, wherein the elastic member is vulcanized-adhered to the ring shaped holder.

* * * * *